United States Patent
Pope et al.

(10) Patent No.: US 8,743,877 B2
(45) Date of Patent: Jun. 3, 2014

(54) HEADER PROCESSING ENGINE

(76) Inventors: Steven L. Pope, Costa Mesa, CA (US);
David Riddoch, Cambridge (GB);
Dimitri Kitariev, Irvine, CA (US);
Derek Roberts, Cambridge (GB)

(*) Notice: Subject to any disclaimer, the term of this patent is extended or adjusted under 35 U.S.C. 154(b) by 595 days.

(21) Appl. No.: 12/686,280

(22) Filed: Jan. 12, 2010

(65) Prior Publication Data
US 2011/0149966 A1    Jun. 23, 2011

(51) Int. Cl.
*H04L 12/28* (2006.01)

(52) U.S. Cl.
USPC .......................................... 370/392; 370/398

(58) Field of Classification Search
None
See application file for complete search history.

(56) References Cited

U.S. PATENT DOCUMENTS

| | | | |
|---|---|---|---|
| 5,272,599 A | 12/1993 | Koenen | |
| 5,325,532 A | 6/1994 | Crosswy et al. | |
| 5,946,189 A | 8/1999 | Koenen et al. | |
| 6,098,112 A | 8/2000 | Ishijima et al. | |
| 6,160,554 A | 12/2000 | Krause | |
| 6,259,699 B1 * | 7/2001 | Opalka et al. | 370/398 |
| 6,304,945 B1 | 10/2001 | Koenen | |
| 6,349,035 B1 | 2/2002 | Koenen | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |

(Continued)

FOREIGN PATENT DOCUMENTS

| | | | |
|---|---|---|---|
| EP | 620521 A2 | 10/1994 | |
| EP | 1085723 A2 | 3/2001 | |

(Continued)

OTHER PUBLICATIONS

Partial European Search Report dated Apr. 27, 2011 in corresponding application EP 10 19 5863, 4pp.

(Continued)

*Primary Examiner* — Robert Wilson
(74) *Attorney, Agent, or Firm* — Haynes Beffel & Wolfeld LLP; Warren S. Wolfeld

(57) ABSTRACT

Roughly described, a header processing engine for a network interface device has a header recognizer to parse the headers of a data packet stored at a buffer to identify the type and position of each header in the packet; a constructor unit; and a processor including an execution pipeline. The header recognizer is configured to, for each header: select in dependence on the header type commands stored at a command memory; and form one or more messages for the constructor unit identifying the selected commands and the position of the header in the data packet. The commands selected for the packet headers are collectively such as to, if executed by the constructor unit, cause the constructor unit to generate a data structure which operates to cause the processor to process of the packet headers without accessing the data packet at the buffer.

54 Claims, 2 Drawing Sheets

(56) References Cited

U.S. PATENT DOCUMENTS

| | | |
|---|---|---|
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,492,763 B1 | 2/2009 | Alexander, Jr. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0007489 A1 | 1/2003 | Krishnan et al. |
| 2003/0037167 A1 | 2/2003 | Garcia-Luna-Aceves et al. |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0165985 A1 | 7/2005 | Vangal et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0226238 A1 | 10/2005 | Hoskote et al. |
| 2005/0226242 A1 | 10/2005 | Parker |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0217453 A1* | 9/2007 | Rhoades et al. ............... 370/503 |
| 2007/0220183 A1 | 9/2007 | Kagan et al. |
| 2008/0024586 A1 | 1/2008 | Barron |
| 2008/0072236 A1 | 3/2008 | Pope et al. |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0245099 A1 | 10/2009 | Tsuchiya |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0150158 A1* | 6/2010 | Cathey et al. ................. 370/392 |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0064084 A1* | 3/2011 | Tatar et al. .................... 370/392 |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0149966 A1* | 6/2011 | Pope et al. .................... 370/392 |
| 2011/0173352 A1 | 7/2011 | Sela et al. |

FOREIGN PATENT DOCUMENTS

| | | |
|---|---|---|
| EP | 1315357 A2 | 5/2003 |
| WO | 0148972 A1 | 7/2001 |
| WO | 0235838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |

(56) References Cited

FOREIGN PATENT DOCUMENTS

WO          2011053305 A1      5/2011
WO          2011053330 A1      5/2011

OTHER PUBLICATIONS

Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Robert Ross, et al.; Proceedings of the 2001 ACM/IEEE conference on Supercomputing, pp. 11, Denver, Nov. 10, 2001.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Cheng Jin, et al.; Proceedings of IEEE Infocom 2004, pp. 1246-1259, Mar. 7, 2004.
Greg Regnier, et al.; Computer, IEEE Computer Society, vol. 37, No. 11, pp. 48-58, Nov. 2004.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Raj K. Singh, et at; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
Charles P. Thacker and Lawrence C. Stewart; ACM Operating Systems Review, vol. 21, Issue 4, p. 164-172, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
M. de Vivo, et al; ACM Computer Communication Review, vol. 29, No. 1, pp. 81-85, Jan. 1999.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
Ian Pratt and Keir Fraser; Proceedings of IEEE Infocom 2001, pp. 67-76, Apr. 22, 2001.
Extended EP search report mailed Nov. 29, 2010 in related application EP 10 18 3452.
Extended EP search report mailed Oct. 5, 2011 in related application EP 10 19 5863.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, 1987, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Robert Ross, et al.; Proceedings of the 2001 ACM/IEEE conference on Supercomputing, pp. 11, Denver, Nov. 10, 2001
Steven J. Sistare, Christopher J. Jackson; Proceedings of the 2002 ACM/IEEE conference on Supercomputing, p. 1-15, Baltimore, Nov. 16, 2002.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Srihari Makineni and Ravi Iyer; Proceedings of the 10th International Symposium on High Performance Computer Architecture, pp. 152, Feb. 14, 2004.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherell; ACM Computer Communication Review, vol. 36, No. 3, pp. 77-78, Jul. 2006.
Geoffray P., "Protocol off-loading vs on-loading in high-performance networks," 14th Symposium on High Performance Interconnects, Aug. 23, 2006, 5pp.
Steven Pope, David Riddoch; ACM Computer Communication Review, vol. 37, No. 2, pp. 89-92, Mar. 19, 2007.
Kieran Mansley, et al.; Euro-Par Conference 2007, pp. 224-233, Rennes, France, Aug. 28, 2007.

(56) References Cited

OTHER PUBLICATIONS

M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Stuart Wray, et al.; Proceedngs of the International Conference on Multimedia Computing and Systems, p. 265-273, Boston, May 1994.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan Apr. 1997, 2pp.
O. Angin, et al.; ACM Computer Communication Review, vol. 27, No. 3, pp. 100-117, Jul. 1997.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Gene Tsudik; ACM Computer Communication Review, vol. 22, No. 5, pp. 29-38, Oct. 1992.
C. Traw and J. Smith; IEEE Journal on Selected Areas in Communications, pp. 240-253, Feb. 1993.
Jonathan M. Smith and C. Brendan S. Traw; IEEE Network, vol. 7, Issue 4, pp. 44-52, Jul. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
Edward D. Lazowska, David A. Patterson, "Computing Research: A Looming Crisis," ACM Computer Communication Review, vol. 35, No. 2, Jul. 2005, pp. 65-68.
W. Feng, et al., "Permormance characterization of a 10-Gigabit Ethernet TOE," Proc. 13th Symp. on High Performance Interconnects, Aug. 17, 2005, pp. 58-63.
B. Leslie, et al., "User-level Device Drivers: Achieved Performance," J. Comput. Sci. & Technol., vol. 20, Sep. 2005, 17pp.
P. Balaji, et al., "Head-to Toe Evaluation of High-Performance Sockets over Protocol Offload Entines," Proceedings of the IEEE International Conference on Cluster Computing, Sep. 2005, 10pp.
Humaira Kamal, et al., "SCTP versus TCP for MPI," Proc.2005 ACM/IEEE conference on Supercomputing, Seattle, Washington, Nov. 12, 2005, 14pp.
Sumitha Bhandarkar, et al., "LTCP: Improving the Permormance of TCP in Highspeed Networks," ACM Computer Communication Review, vol. 36, No. 1, Jan. 2006, pp. 41-50.
H. K. Jerry Chu, "Zero-Copy TCP in Solaris," Proc. USENIX Annual Technical Conference Jan. 1996, 13pp.
Jose Carlos Sancho, et al., "Quantifying the Potential Benefit of Overlapping Communication and Computation in Large-Scale Scientific Applications," Proc.2006 ACM/IEEE conference on Supercomputing, Tampa, Florida, Nov. 11, 2006, 16pp.
M.V. Wilkes and R.M. Needham, "The Cambridge Model Distributed System," ACM SIGOPS Operating Systems Review, vol. 14, Issue 1, pp. 21-29, Jan. 1980.
Partial European Search Report dated Apr. 27, 2011 in corresponding application EP 10 19 5863.
F.F. Kuo, "The ALOHA system," ACM Computer Communication Review, vol. 4 No. 1, Jan. 1974, pp. 5-8.
Robert K. Brandriff, et al.; "Development of a TCP/IP for the IBM/370," ACM SIGCOMM Computer Communication Review, vol. 15, No. 4, Sep. 1985, pp. 2-8.
C. Kline, "Supercomputers on the internet: a case study," ACM Computer Communication Review, vol. 17, No. 5, Aug. 1987, pp. 27-33.
Derek Robert McAuley, "Protocol Design for High Speed Networks," Ph.D. Thesis, University of Cambridge, Sep. 1989, 104 pp.
Bruce S. Davie, "A host-network interface architecture for ATM," ACM Computer Communication Review, vol. 21, No. 4, Sep. 1991, pp. 307-315.
Greg Chesson, "The Evolution of XTP," Proceedings of the Third International Conference on High Speed Networking, Nov. 1991, 10 pp.
Michael J. Dixon, "System support for multi-service traffic," University of Cambridge Computer Laboratory Technical Report No. 245, Jan. 1992, 113 pp.
Danny Cohen, Gregory Finn, Robert Felderman, Annette DeSchon; Made available by authors, Jan. 10, 1992, "ATOMIC: A Local Communication Network Created through Repeated Application of Multicomputing Components," 11 pp + cover.
Peter Steenkiste, "Analyzing communication latency using the Nectar communication processor," ACM Computer Communication Review, vol. 22, No. 4, Oct. 1992, pp. 199-209.

(56) References Cited

OTHER PUBLICATIONS

Paul E. McKenney and Ken F. Dove, "Efficient demultiplexing of incoming TCP packets," ACM Computer Communication Review, vol. 22, No. 4, Oct. 1992, pp. 269-279.

Erich Ruetsche and Matthias Kaiserswerth, "TCP/IP on the parallel protocol engine," Proceedings of the IFIP TC6/WG6, 4 Fourth International Conference on High Performance Networking IV, Dec. 14, 1992, pp. 119-134.

E. Ruetsche, "The architecture of a Gb/s multimedia protocol adapter," ACM Computer Communication Review, vol. 23, No. 3, 1993, Jul. 1993, pp. 59-68.

Jeffrey R. Michel, "The Design and Evaluation of an Off-Host Communications Protocol Architecture," M.Sci. Thesis, University of Virginia, 1993, Aug. 1993, 139 pp.

Mark David Hayter, "A Workstation Architecture to Support Multimedia," Ph.D. Thesis, University of Cambridge, 1993, Sep. 1993, 111 pp.

C. A. Thekkath, et al., "Implementing network protocols at user level," ACM Computer Communication Review, vol. 23, No. 4, 1993, Oct. 1993, pp. 64-73.

Raj K. Singh, et al.; Proceedings of the 1993 ACM/IEEE conference on Supercomputing, p. 452-461, Portland, Oregon, Nov. 15, 1993.

Danny Cohen, Gregory Finn, Robert Felderman, Annette DeSchon, "ATOMIC: A High Speed Local Communication Architecture," Journal of High Speed Networks, vol. 3:1 (1994), pp. 1-28.

Gregory G. Finn and Paul Mockapetris, "Netstation Architecture Multi-Gigabit Workstation Network Fabric," Proceedings of InterOp '94, Las Vegas, Nevada, May 1994, 9pp.

"MPI: A Message-Passing Interface Standard," various forum members, Message-Passing Interface Forum, University of Tennessee, Knoxville, 1994, May 5, 1994 (corrected version), 239 pp.

P. Druschel, et al. "Experiences with a high-speed network adaptor: a software perspective," ACM Computer Communication Review, vol. 24, No. 4, 1994, Oct. 1994, pp. 2-13.

L.S. Brakmo, et al., "TCP Vegas: new techniques for congestion detection and avoidance," ACM Computer Communication Review, vol. 24, No. 4, Oct. 1994, p. 24-35.

Mengjou Lin, et al., "Performance of High-Speed Network I/O Subsystems: Case Study of a Fibre Channel Network," Proc.1994 Conf. on Supercomputing, Washington D.C., Nov. 14, 1994, pp. 174-183.

A. Edwards, S. Muir, "Experiences implementing a high performance TCP in user-space," ACM Computer Communication Review, vol. 25, No. 4, 1995, Oct. 1995, pp. 196-205.

J. C. Mogul, "The case for persistent-connection HTTP," ACM Computer Communication Review, vol. 25, No. 4, 1995, Oct. 1995, pp. 299-313.

Paul Ronald Barham, "Devices in a Multi-Service Operating System," Ph.D. thesis, University of Cambridge, 1996, Jul. 1996, 142pp.

Chi-Chao Chang, et al., "Low-Latency Communication on the IBM Risc System/6000 SP," Proc. 1996 ACM/IEEE conference on Supercomputing, Pittsburgh, Nov. 17, 1996, 17pp.

Michael S. Warren, et al., "Avalon: An Alpha/Linux Cluster Achieves 10 Gflops for $150k," Proc. 1998 ACM/IEEE conference on Supercomputing, Orlando, Florida, Nov. 7, 1998, 10pp.

John Salmon, et al., "Scaling of Beowulf-class Distributed Systems," Proc. 1998 ACM/IEEE conference on Supercomputing, Orlando, Florida, Nov. 7, 1998, 18pp.

Derek Chiou, Boon S. Ang, et al., "StarT-Voyager: A Flexible Platform for Exploring Scalable SMP Issues," Proc. 1998 ACM/IEEE conference on Supercomputing, Orlando, Florida, Nov. 7, 1998, 20pp.

S. L. Pope, et al., "Enhancing Distributed Systems with Low-Latency Networking," Parallel and Distributed Computing and Networks, Brisbane, Australia, 1998, Dec. 1998, 10pp.

M. Allman, "TCP Byte Counting Refinements," ACM Computer Communication Review, vol. 29, No. 3, 1999, Jul. 1999, pp. 14-22.

Steve Muir and Jonathan Smith, "Piglet: A Low-Intrusion Vertical Operating System," Technical Report MS-CIS-00-04, University of Pennsylvania, 2000, Jan. 2000, 15pp.

W. Feng and P. Tinnakornsrisuphap, "The Failure of TCP in High-Performance Computational Grids," Proc. 2000 ACM/IEEE conference on Supercomputing, Dallas, Texas, Nov. 4, 2000, 11p.

Jenwei Hsieh, et al., "Architectural and Performance Evaluation of GigaNet and Myrinet Interconnects on Clusters of Small-Scale SMP Servers," Proc. 2000 ACM/IEEE conference on Supercomputing, Dallas, Texas, Nov. 4, 2000, 9pp.

Bruce Lowekamp, et al., "Topology discovery for large ethernet networks," ACM SIGCOMM Computer Communication Review—Proc. 2001 SIGCOMM conf., vol. 31, No. 4, Oct. 2001, pp. 237-248.

Piyush Shivam, et al., "EMP: Zero-copy OS-bypass NIC-driven Gigabit Ethernet Message Passing," Proc. 2001 ACM/IEEE Conf. on Supercomputing, Denver, Nov. 10, 2001 (8 pp).

Robert Ross, et al., "A Case Study in Application I/O on Linux Clusters," Proc. 2001 ACM/IEEE Conf. on Supercomputing, Denver, Nov. 10, 2001, 17pp.

E. Blanton and M. Allman, "On Making TCP More Robust to Packet Reordering," ACM Computer Communication Review, vol. 32, No. 1, Jan. 2002, pp. 20-30.

Murali Rangarajan, et al., "TCP Servers: Offloading TCP Processing in Internet Servers. Design, Implementation, and Performance," Technical Report DCR-TR-481, Computer Science Department, Rutgers University, Mar. 2002, 14 pp.

Jon Crowcroft, Derek McAuley, "ATM: A Retrospective on Systems Legacy or 'A technology with a fabulous future behind it?'", ACM Computer Communication Review, vol. 32, No. 5, Nov. 2002, pp. 11-12. (introduces 4 articles spanning pp. 13-27; by Kalmanek pp. 13-19, Grossman pp. 21-24, Crosby et al. pp. 25-28, and Smith pp. 29-37).

NR Adiga, et al., "An Overview of the BlueGene/L Supercomputer," Proceedings of the 2002 ACM/IEEE conference on Supercomputing, Baltimore, Nov. 16, 2002, pp. 1-22.

R. Bush, D. Meyer: IETF Network Working Group, Request for Comments memo: 3439 [extending RFC1958], Dec. 2002, Some Internet Architectural Guidelines and Philosophy, 25 pp, The Internet Society (c)2002.

Pasi Sarolahti, et al., "F-RTO: an enhanced recovery algorithm for TCP retransmission timeouts," ACM Computer Communication Review, vol. 33, No. 2, Apr. 2003, pp. 51-63.

Derek McAuley, Rolf Neugebauer, "A case for virtual channel processors," NICELI '03 Proc.of the ACM SIGCOMM workshop, Aug. 2003, pp. 237-242.

Justin Hurwitz, Wu-chun Feng, "Initial end-to-end performance evaluation of 10-Gigabit Ethernet," Proc. 11th Symposium on High Performance Interconnects, Aug. 2003, pp. 116-121.

Vinay Aggarwal, et al., summary, NICELI workshop, ACM SIGCOMM Computer Communication Review, vol. 33, No. 5, Oct. 2003, pp. 75-80.

Wu-chun Feng, et al., "Optimizing 10-Gigabit Ethernet for Networks of Workstations, Clusters, and Grids: A Case Study," Proceedings of the 2003 ACM/IEEE conference on Supercomputing, Phoenix, Arizona, Nov. 2003, 13 pp.

Jiuxing Liu, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp (58-71).

Andy Currid, "TCP Offload to the Rescue," ACM Queue, vol. 2, No. 3, May 1, 2004, pp. 58-65.

Declaration of Dr. Gregory L. Chesson in Support of Microsoft's Opposition to Alacritech's Motion for Preliminary Injunction; United States District Court, Northern District California, San Francisco Division, Case No. 3:04-cv-03284-JSW, filed Feb. 4, 2005, 289 pp. including exhibits (declaration is 25 pp).

* cited by examiner

HEADER PROCESSING ENGINE

BACKGROUND OF THE INVENTION

This invention relates to a header processing engine for processing packet headers.

Computer systems on modern data packet networks typically exchange data in accordance with several different protocols operating at all layers of the network—from protocols governing the quality of service of data streams, to protocols determining the logical construction of data packets, to protocols determining the physical signaling of fully-formed data packets onto the fabric of the network. A typical network data packet will therefore have multiple headers formed in a nested arrangement as the data packet is built up at a computer system. Often data packets will include one or more headers at each of layers 2 to 5 of the Open System Interconnection (OSI) model.

For example, a TCP/IP data packet transmitted over an Ethernet network over which a logical VLAN has been established might have a nested header structure similar to the following:

Ethernet/VLAN/IP/TCP

Additionally the packet could have layer 5 headers within the above structure, such as a NetBIOS header.

The headers of a data packet tell a computer system handling the data packet all of the information it needs to know in order to correctly route the payload data of the data packet to its destination and to respond appropriately to the originator of the data packet. Without the packet headers the payload data is simply a series of bits without any context and a computer system would not know how to handle the data. On receiving a data packet a computer system must therefore process the headers of the data packet in order to determine what it is going to do with the data packet.

Generally, some of the header processing is done in software in the end system and some of the header processing is done in hardware. Software processing usually follows the model of a layered protocol stack, with successive headers being stripped and processed in turn. In contrast, hardware processing may process only some headers, or handle combinations of headers as a single entity, in order perform the required operations. Header processing at hardware can be particularly useful for routing packet data, accelerating packet delivery, or for manipulating the header of a packet.

Header processing in hardware is generally performed at a network interface device. As each data packet is received, the network interface device parses the headers of the data packet and performs such operations as: performing checksums, extracting data and looking up the intended destination of the data packet using the address data in the headers. The operations performed generally depend on the type of headers present in the data packet. Since multiple operations are typically required for each data packet and there can be millions of data packets arriving over a network at a computer system every second it is important to ensure that the headers are processed as efficiently and with as little latency as possible.

Conventional header processing hardware uses a dedicated processor to parse the headers in a data packet and perform the processing required for each header as the headers are identified. Such a processor can be efficient in terms of the number of operations the hardware is required to perform, but often waste processor cycles as the same processor executes each operation in the necessary order. For example, the processor must read header data from the packet buffer, identify the headers in each data packet, request look-up operations in forwarding tables at the network interface device, and make calls to hash calculation units at the network interface device. Furthermore, the instruction set of the processor must be large enough to support the range of operations the processor is expected to perform. This can lead to complex processors being used to perform what are in essence a series of repetitive simple operations. Such processors are power inefficient, which is a particular concern in network interface devices for use in blade servers and data farms.

Furthermore, implementing header processing in hardware or firmware using the classic layered protocol stack model is very inefficient, requiring hardware configured to constantly process chains of if-then-else logic over sequences of headers.

There is therefore a need for an improved header processing engine for a network interface device which addresses the above problems.

SUMMARY OF THE INVENTION

According to a first aspect of the present invention there is provided header processing engine for a network interface device having a buffer for holding one or more data packets each having one or more headers, the header processing engine comprising: a command memory; a header recognizer configured to parse the headers of a data packet stored at the buffer so as to identify the type and position of each header in the data packet; a constructor unit having read access to the headers of the data packet; and a processor including an execution pipeline; the header recognizer being further configured to, for each header: (a) select in dependence on the type of the header one or more commands stored at the command memory; and (b) form one or more messages for the constructor unit identifying the selected commands and the position of the header in the data packet; the commands selected for the headers of the data packet being collectively such as to, if executed by the constructor unit, cause the constructor unit to generate a data structure which is such as to be operable to cause the processor to effect processing of the headers of the data packet without accessing the data packet at the buffer; and the constructor unit being configured to receive the messages and execute the commands identified therein.

Preferably the header processing engine further comprises a shared memory accessible to the processor at which the constructor unit is configured to write the data structure. Preferably the data structure identifies a set of instructions for execution by the processor and the processor is configured to access the data structure and execute the instructions identified therein so as to effect processing of the headers of the data packet. Suitably the data structure includes one or more parts of the headers. Preferably the data structure includes only those parts of the headers required for the execution of one or more of the said instructions.

Preferably the data structure includes a packet class identifier which uniquely represents the sequence of headers of the data packet, the packet class identifier identifying the said set of instructions for execution by the processor. Preferably the packet class identifier represents a memory address at an instruction memory of the processor and the processor is configured to, on reading the packet class identifier, access the memory address and initiate execution of the instructions stored at the memory address. Preferably the constructor unit is configured to generate the packet class identifier by forming a representation of the particular sequence of headers of the data packet and passing the representation to a compression engine whose only available outputs correspond to valid sequences of headers, the output of the compression engine being the packet class identifier.

Preferably the shared memory is configured to hold a plurality of data structures, each data structure corresponding to a different data packet. Preferably the shared memory is configured to allow the constructor unit and the processor to have concurrent access to different data structures, the processor having exclusive access to data structures completed by the constructor unit.

Preferably the processor is configured to, on initiating execution of one or more predetermined instructions that cause the processor to call a functional unit which does not share the execution pipeline of the processor, switch execution threads by: storing the state of its execution pipeline at the data structure corresponding to the data packet in respect of which the call is made; loading the state of a different data structure stored at the shared memory into its execution pipeline; and executing the set of instructions identified at the different data structure.

Preferably the processor is configured such that the data returned in response to a call to a functional unit is written to a selected register of the processor so as to be available to the execution pipeline when the processor next loads the state stored at the data structure corresponding to the data packet in respect of which the call was made. Preferably the processor is configured to, on making a call to a functional unit, set a flag for the selected register into which data returned in response to that call is to be written, the flag preventing the processor selecting that register for another call until the flag is cleared. Suitably the processor is configured to, on reading the data from the selected register, clear said flag so as to allow the processor to select that register for a subsequent call. Suitably at least one of the predetermined instructions cause the processor to, when executed, call a lookup engine or a hash engine. Preferably the processor is configured to, responsive to the said instructions, write to each data structure the respective output of the processor.

The data packet can be a data packet received over the network, the network interface device being supported at a data processing system supporting one or more operating systems, and the processor being configured to, responsive to said instructions, provide to the network interface device data identifying a receive queue of the data processing system to which at least part of the received data packet is to be written.

A network interface device can comprise a header processing engine as described herein, the header processing engine being configured to, on the processor completing processing of the headers of the data packet, make at least part of the output of the processor available to a packet processing engine configured to process the data packets held at the buffer at least partly in dependence on the output of the processor.

The data packet can be a partially-formed data packet for transmission over the network, the network interface device being supported at a data processing system supporting one or more operating systems, and the processor is configured to, responsive to said instructions, process the headers of the partially-formed data packet in such a way as to complete the data packet.

Suitably the processor is configured to complete the data packet by performing one or more of the following operations: if the data packet belongs to a data flow to be transmitted in accordance with a predetermined level of a quality of service protocol, write appropriate quality of service parameters to the data packet so as to cause the data packet to be handled in accordance with that predetermined level; if the data packet is to be transmitted over a virtual LAN, write appropriate virtual LAN parameters to the data packet so as to cause the data packet to be routed over that virtual LAN; and if the data packet originated at a virtual interface of the network interface device, perform packet filtering so as to ensure that the data packet is transmitted onto the network only if the destination address of the data packet is a network endpoint to which that virtual interface has been granted access.

Preferably each header of the data packet comprises a set of data bits formatted in accordance with a network data protocol and each set of data bits is located within nested headers of the data packet, a footer of the data packet, or at any other point in the data packet.

According to a second aspect of the present invention there is provided a header processing engine for performing header processing of a sequence of data packets each having multiple headers, the header processing engine comprising: a header recognizer configured to parse the headers of each data packet in a sequence of data packets and, for each data packet, form one or more messages indicating the type and position of each header in the data packet, the header recognizer being configured to parse the data packets in sequence; and a processor configured to perform header processing on each data packet of the sequence in dependence on the one or more messages formed for that data packet and provide in sequence at its output processed data packets; wherein the header recognizer and the processor are configured to operate in parallel so as to allow the processor to perform header processing on the data packets out of sequence.

Preferably the header recognizer and processor operate such that when the processor is processing one data packet in a sequence of data packets, the header recognizer is parsing another data packet in the sequence. Preferably the header recognizer is configured to parse the headers of the data packet sequentially and to, on identifying the type and position of each header in the data packet, form a message for the processor comprising the type of that header and the position of that header in the data packet.

Preferably the header recognizer is configured to identify the position of each header in the data packet by detecting one or more predetermined sequences of bits in the headers of the data packet. Suitably the predetermined sequences of bits indicate the start or end of a header. Suitably the header recognizer is operable to identify the type of a header in the data packet by detecting one or more predetermined values representing header type. Suitably the header recognizer is operable to identify the type of a header in the data packet using the position of the header in the data packet.

The processor can be configured to, in dependence on the types of header identified in the one or more messages formed for a particular data packet, select a set of instructions stored at an instruction memory of the processor and process that data packet using the selected set of instructions. Alternatively the header recognizer is configured to, in dependence on the types of header identified in the one or more messages formed for a particular data packet, select a set of instructions stored at an instruction memory of the processor and cause the processor to process that data packet using the selected set of instructions.

According to a third aspect of the present invention there is provided a header processing engine for performing header processing of a sequence of data packets stored at a buffer, each of the data packets having multiple headers and the header processing engine comprising: a processor having an execution pipeline; and a pre-processor unit configured to parse the headers of a data packet stored at the buffer and, in dependence on the types of headers in the data packet, form a data structure identifying a set of instructions, the data structure being such as to be operable to cause the processor to effect processing of the headers of the data packet without accessing the data packet stored at the buffer; wherein the processor is configured to access the data structure and execute the said set of instructions so as to process the headers of the data packet.

Preferably the header processing engine further comprises a shared memory accessible to the processor at which the pre-processor unit is configured to write the data structure. Suitably the data structure includes one or more parts of the headers of the data packet. Preferably the data structure includes only those parts of the headers required by one or more of the said instructions.

Preferably the pre-processor unit is configured to select the set of instructions in dependence on the types of headers in the data packet. Preferably the processor supports an instruction memory and the set of instructions are stored in the instruction memory at a location identified in the data structure.

Preferably the pre-processor unit is configured to generate a packet class identifier which uniquely represents the types of headers of the data packet, the packet class identifier being included in the data structure and identifying the said set of instructions for execution by the processor. Preferably the packet class identifier represents a memory address at an instruction memory of the processor and the processor is configured to, on reading the packet class identifier, access the memory address and initiate execution of the instructions stored at the memory address. Preferably the pre-processor unit is configured to generate the packet class identifier by forming a representation of the particular sequence of headers of the data packet and passing the representation to a compression engine whose only available outputs correspond to valid sequences of headers, the output of the compression engine being the packet class identifier.

Preferably the shared memory is configured to hold a plurality of data structures, each data structure corresponding to the headers of a different data packet. Preferably the shared memory is configured to allow the pre-processor unit and the processor to have concurrent access to different data structures, the processor having exclusive access to data structures completed by the pre-processor unit.

Preferably the processor is configured to, on initiating one or more predetermined instructions that cause the processor to call a functional unit which does not share the execution pipeline of the processor, store the state of its execution pipeline at the data structure corresponding to the data packet in respect of which the call is made and load the state of a different data structure stored at the shared memory into its execution pipeline.

Preferably the processor is configured such as to cause the data returned in response to a call to a functional unit to be written to a selected register of the processor so as to be available to the execution pipeline when the processor next loads the state stored at the data structure corresponding to the data packet in respect of which the call was made. Preferably the processor is configured to, on making a call to a functional unit, set a flag for the selected register into which data returned in response to that call is to be written, the flag preventing the processor selecting that register for another call. Preferably the processor is configured to, on reading the data from the selected register, clear said flag so as to allow the processor to select that register for a subsequent call.

Suitably at least one of the predetermined instructions cause the processor to, when executed, call a lookup engine, a hash engine, a checksum or CRC calculation engine, an encryption engine, or a chain of any of the aforementioned engines arranged in any order.

Preferably the processor is configured to, responsive to the said instructions, write to each data structure the respective output of processing performed by the processor.

According to a fourth aspect of the present invention there is provided a processor configured for processing network data packets and comprising: an instruction memory storing a plurality of instruction sequences; a processor memory for storing a plurality of instruction references and sets of state of the processor, each instruction reference identifying an instruction sequence stored at the instruction memory and each set of state corresponding to an instruction reference; and an execution pipeline operable to execute an instruction sequence identified by an instruction reference using the corresponding set of state stored at the processor memory, an instruction sequence and its corresponding state defining an execution thread for processing a particular network data packet; the processor being configured to be operable to, during processing of a first network data packet by executing an instruction sequence identified by a first instruction reference, switch execution threads so as to process a second network data packet by: writing the state of the execution pipeline to a first set of state at the processor memory; loading a second set of state into the execution pipeline from the processor memory; and executing a second instruction sequence identified by an instruction reference corresponding to the second set of state; wherein the processor is configured to switch execution threads on initiating execution of one or more predetermined instructions in an instruction sequence.

Preferably the first set of state includes an indication of the position in the first instruction sequence up to which execution has been performed.

Preferably the predetermined instruction causes the processor to, when executed, call a functional unit which does not share the execution pipeline of the processor. The functional unit may be supported at the processor.

Preferably the processor further comprises a plurality of registers and is configured such as to cause the data returned in response to a call to the functional unit to be written to a selected one of the registers.

Preferably the processor being configured to switch between the plurality of execution threads defined at the processor memory on a round-robin basis and, on subsequently switching back to the execution thread defined by the first set of state and the first instruction sequence: write the state of the execution pipeline to the processor memory at the set of state corresponding to the instruction sequence being executed at the execution pipeline; load the first set of state into the execution pipeline; and continue execution of the first instruction sequence.

According to a fifth aspect of the present invention there is provided a method for switching between execution threads at a processor configured for processing network data packets and having an execution pipeline, an instruction memory storing a plurality of instruction sequences, and a processor memory storing first and second instruction references and corresponding first and second sets of state of the processor, each instruction reference identifying an instruction sequence stored at the instruction memory and each instruction sequence and its corresponding state defining an execution thread for processing a particular network data packet, the method comprising: during processing of a first network data packet by executing at the execution pipeline the instruction sequence identified by the first instruction reference, pausing execution at the execution pipeline; writing the state of the execution pipeline to the first set of state at the processor memory; loading the second set of state into the execution pipeline from the processor memory; and executing at the execution pipeline the instruction sequence identified by the second instruction reference so as to effect processing of a second network data packet.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention is directed to providing an improved header processing engine having a pipelined architecture. The header processing engine described herein provides a mechanism for representing the various header layers of a data packet with a single identifier and for providing a data structure having all the data required for processing the headers of that data packet. The header processing engine can be used to process the headers of data packets received over a network at a network interface device so as to allow incoming data packets to be deconstructed. The header processing engine can be used to process the headers of data packets being prepared for transmission over a network by a network interface device so as to allow outgoing data packets to be properly formed. Typically, a header processing engine can be configured to perform processing on the headers of a packet relating to network protocols at any of layers 2 to 5 of the Open System Interconnect (OSI) model.

Note that the term "header" is used herein to refer to network or application protocol data structures which are embedded within a data packet. A header may be any information represented by a set or string of distinguished bits at any point in a data packet—for example, a "header" as referred to herein could be a set of data bits (which could represent an OSI layer, e.g. TCP protocol data) within the nested headers of a data packet, the footer of a data packet (e.g. representing a CRC), or at any other point in a data packet (e.g. an embedded http URL). Thus, each header of a data packet is a set of data bits formatted in accordance with a particular network data protocol with which the data packet complies. The skilled person will recognise that the present invention is not limited in terms of where the data occurs within a data packet and that the principles of the present invention can be applied to any data within a network data packet so as to effect the necessary header processing (e.g. packet routing, protocol enforcement etc.).

Figure 1:
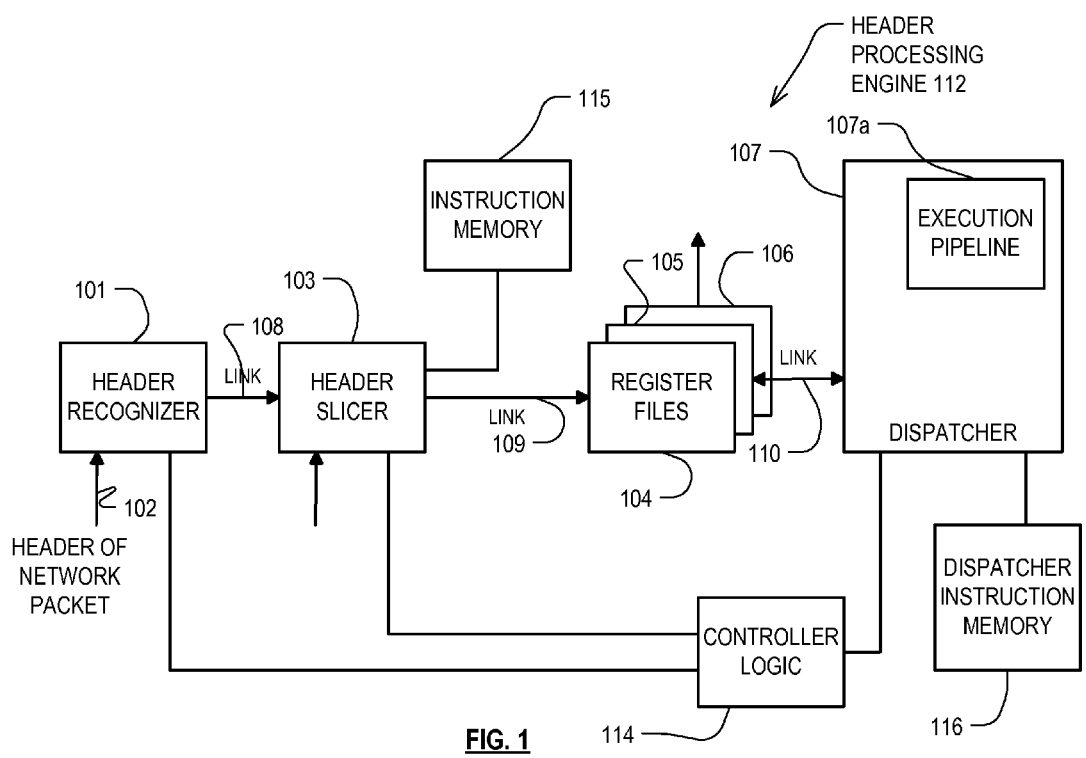
FIG. 1 is a schematic diagram of a header processing engine configured in accordance with the present invention.

An overview of a header processing engine (HPE) 112 configured in accordance with the present invention is shown in FIG. 1. The HPE comprises a header recognizer (HR) 101, a header slicer (HS) 103 and a dispatcher 107. The header recognizer and header slicer are arranged to read the headers of data packets to be processed by the HPE. The payload data of the data packets is not required by the HPE because all the information relating to the processing of packet headers is found in the headers. Checksums and other parameters calculated in dependence on the payload data are not handled by the HPE—these would be performed by other dedicated engines within the network controller.

The header recognizer, header slicer and dispatcher are defined by the functions they perform. Each of these components of the HPE may be embodied as a discrete integrated circuit, or two or more of the components may be embodied in a single integrated circuit. The HPE could be embodied as part of a larger integrated circuit, such as a controller of an network interface device. The header recognizer and header slicer have read access to the headers of the partially or fully formed data packets which are to be processed by the HPE. These data packets are typically in a buffer memory at a network interface device having been received over the network, or being in the process of being prepared for transmission over the network. An HPE configured in accordance with the present invention can be used on either or both of the transmit and receive paths of a network interface device.

Figure 2:
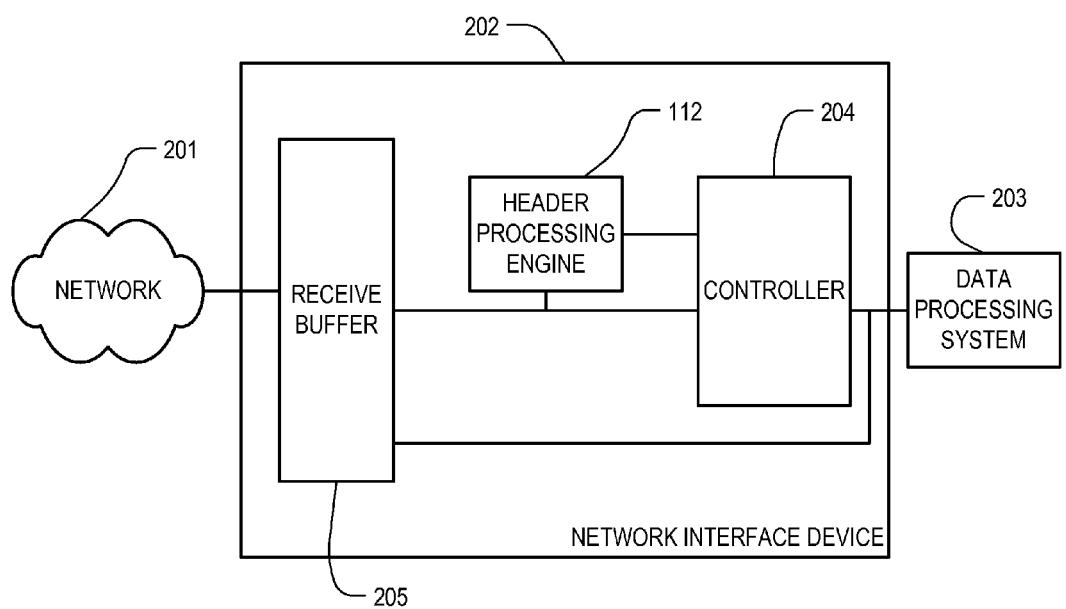
FIG. 2 is an overview of the arrangement of a header processing engine at a network interface device.

FIG. 2 illustrates the arrangement at a network interface device of a header processing engine configured in accordance with the present invention. Network interface device 202 is arranged to convey data packets between network 201 and data processing system 203, such as a server or desktop computer.

In the first instance, consider the case in which the HPE is implemented on the receive path of NIC 202. In this case, the NIC comprises a receive buffer 205 in which data packets received from the network are stored before being passed to the data processing system. In order for the received data packets to be correctly handled the network interface device must process the headers of the data packets. The headers carry the information the network interface device requires in order to know what to do with each packet, including, for example: routing information necessary for delivery to a particular virtual interface, the parameters of the various protocols in which the packet is in accordance, checksums, etc.

The packets in receive buffer 205 are accessible to the header processing engine 112 so as to allow the header recognizer 101 and slicer 103 of the HPE to read the headers of the received data packets (possibly via an intermediate buffer). A controller 204 represents the processing functionality of the NIC and is configured to handle the received data packets in dependence on the output of the HPE—for example, writing the payload data to a particular location in a memory of the data processing system and writing an event into an event queue.

The HPE can be configured to perform the various header processing required for the proper handling of received network data packets. For example, the processing of headers by the HPE may provide the information required by the network interface device in order to effect the delivery of received data packets (or at least their payload data) into the appropriate receive queues. Typically this requires the HPE to cause one or more lookups to be performed at a forwarding table which indicates the correspondence between (to give IP data packets as an example) IP address and port combination and receive queue.

The processing performed by the HPE can also be used to enforce network protocols. For example, implementing firewalls, or preventing denial of service attacks.

The processing performed by the HPE can also include modifying the contents of received data packets so as to perform operations such as network address translation (NAT), which may be required for the translation of network addresses onto the address spaces supported at a virtualised system supporting multiple guest operating systems, or for the translation of network addresses at a network interface device acting as a switch or bridge between networks.

In the second instance, consider the case in which the HPE is implemented on the transmit path of NIC 202. In this case, the NIC comprises a transmit buffer 205 in which data packets received from the data processing system are stored before being transmitted onto the network. The NIC can be configured to perform any header processing required prior to transmitting the data packets onto the network. For example, the NIC can be configured to perform filtering and pacing of data packets for transmission onto the network using HPE 112. Any data packets which have only partially-formed headers must be completed by the NIC before being transmitted onto the network.

For example, if the NIC is to safely provide direct access to the guest operating systems of a virtualised system, the NIC must examine all outbound traffic to ensure that it only contains legal and non-disruptive packets. In other words, if the NIC supports direct communication with a guest operating system (i.e. by means of a virtual interface and not via a hypervisor, or equivalent), it must filter the communications of that guest OS so as to ensure that the guest OS only communicates with those network addresses to which it has been granted access by the privileged mode entity of the system (i.e. the kernel or hypervisor). This helps prevent any malicious code running at the guest OS hijacking the network connections of other guest OSes or the hypervisor. To effect packet filtering, the NIC is required to make a decision as to whether formed data packets are released onto the physical network or are discarded. The HPE is configured accordingly to provide the data on which this decision is to be made. Since the packet filtering is typically based on an identifier of the source of an outbound data packet, this would generally include a source network address from a header of each data packet from a guest OS.

In certain virtualized environments, a NIC is required to act as a proxy for the nearest upstream switch. In this case, the HPE can be configured to provide information that can be used to make a decision as to whether the outbound packet data is transmitted over the physical network, or looped back for delivery to another local operating system, or to both as part of a multicast operation.

The HPE can be further configured to modify data packets prior to transmission. For example, in a network in which one or more VLANs are operating, the HPE can be configured to write or update address information or other parameters stored at the headers of a data packet so as to ensure that the data packet is routed over the appropriate virtual and physical networks. This may require the HPE to perform address translation between virtual and physical network addresses. Thus, the HPE could be configured to update a VLAN header using data established by means of one or more lookups at a forwarding table of the NIC at which VLAN information for the network is held. The completion of VLAN header parameters at a network interface device is well known in the art, but prior art devices do not perform such completion operations by means of an HPE as described herein. Generally, complex manipulation of VLAN headers is not required by a network interface device unless the network interface device is being used as a proxy to an external switch.

The HPE can also be configured to enforce Quality of Service (QoS) for data streams supported by the network interface device. For example, the HPE can be configured to enforce QoS for a particular traffic class, network endpoint or virtual interface. This generally involves the HPE identifying from its headers (for example by virtue of the DMA channel from which a transfer request were placed, or by virtue of some data within the packet such as VLAN, MAC address or IP flow information) that a data packet belongs to a particular traffic class or virtual interface and writing one or more corresponding QoS parameters to the headers in accordance with parameters stored at the network interface device (e.g. at a forwarding table). Thus, the HPE could be configured to recognise data packets belonging to a video stream requiring a particular QoS level and write the appropriate QoS parameters to those data packets so as to cause the data packets to be handled in accordance with that QoS level. As well as embedding QoS parameters in a data packet, the HPE preferably also act as a QoS enforcement point and ensures that packets injected onto the network from the NIC conform to the required QoS level.

The operation of a header processing engine configured in accordance with the present invention will now be described with reference to FIG. 1.

Header recognizer 101 performs the first step in processing a packet header and parses a data packet in order to identify the various header parts which make up the header of the data packet. The header recognizer reads the header of the network packet 102, which typically has several layers relating to the various network protocols in use over the network. For example, an Ethernet data packet might comprise Ethernet, VLAN, IPv4 and TCP headers. The header recognizer identifies the individual headers present in the compound header of the data packet by, for example, looking for characteristics such as the length of fields in the compound header, the format of the compound header and particular flags or data bits in the compound header.

Header recognizer 101 identifies each of the individual headers making up the header of the data packet and the offset at which each of the individual headers occurs in the data packet. The header recognizer is preferably implemented as a microprocessor having a dedicated instruction set. The instruction set can be made as wide as is required to parse the various header layers the header processing engine is expected to deal with. However, for typical Ethernet network interface devices supporting TCP/IP communications the total instruction width can be as small as 32 bits. As the header recognizer parses the data packet header, instructions are executed which determine, for example, the length of a header layer in a packet header, the type of a header layer, whether the end of the header has been reached, and the offset of a header layer in the data packet. The output of each instruction defines a command for slicer 103 which comprises instructions in the form of jump vectors that refer to instructions in the instruction memory 115 of the slicer. The particular set of slicer instructions forming the command depends on the particular type of header that the command deals with. One or more commands instruct the slicer how to deal with each layer of the nested headers of the subject data packet. The parameters of a given command typically inform the slicer where the corresponding header is in the data packet (i.e. its offset) and what type of header it is.

It is advantageous if the header recognizer forms a data word (hereinafter, "parser_info") comprising the header types and location information describing the offsets of the various headers in the data packet. The parser_info word can be built up bit by bit as HR 101 parses the header. By providing the word to a FIFO message buffer, other processing entities on the receive/transmit (as appropriate) data path can use the information generated by the header recognizer. For example, the information parsed by the header recognizer and formed into a parser_info word can be used by a checksum offload engine at the network interface device supporting the HRE.

Header slicer 103 receives the commands from header recognizer 101 by means of link 108 (which could be a simple FIFO buffer). The slicer is a microprocessor having a dedicated instruction set stored at a memory 115, with the slicer instructions being referred to by jump vectors in the commands received from the header recognizer. In response to each command the header slicer executes the set of instructions corresponding to the instructions jump vectors in the command using the parameters passed to it with the command. The instructions executed by the slicer build up a register file 104 which comprises all the data required by dispatcher 107 to process the packet header.

The register file comprises data read by the slicer from the header of the data packet and information generated by the slicer in dependence on the content of the header of the data packet. In order to process certain layers of a data packet header the dispatcher requires at least some of the data of the header; for such layers the commands from the header recognizer cause the slicer to execute instructions which read the required data and write it into the register file for the data packet over link 109. The dispatcher also needs to know the structure of the data packet; this knowledge is passed to the dispatcher by the slicer writing a packet class identifier into the register file for the data packet which uniquely identifies the composition of the data packet.

The slicer generates the packet class identifier which uniquely identifies the header types and their order in the header of the data packet. The slicer preferably forms the packet class identifier at a plurality of registers which hold the result of instructions executed at the slicer. For example, the header processing engine of an Ethernet network card could have the following sub-class registers:

| | | |
|---|---|---|
| mac_class | 1 bit | set if packet has a multi-cast destination MAC address |
| eth_base_class | 4 bits | identifies the base Ethernet header, e.g. Ethernet, LLC |
| eth_tag_class | 4 bits | identifies presence of any tags e.g. VLAN, VNTag |
| l3_class | 4 bits | identifies the next protocol after base Ethernet, e.g. IPv4, IPv6, IPv4-fragment, IPv6-fragment, FCoE, ARP |
| l4_class | 4 bits | identifies layer 4 protocol, e.g. TCP, UDP |

The registers are set as the slicer traverses the headers under the control of the commands generated by the header recognizer.

The manner in which a register file is built up can be better appreciated by considering the following example. The header recognizer parses the subject data packet and identifies a base Ethernet header. As a result, the header recognizer generates a command indicating the type (base Ethernet) and offset (its location) of the identified header to the slicer. The slicer receives the command and calls the set of instructions corresponding to a command indicating the presence of a base Ethernet header. These instructions cause the slicer to read predetermined parts of the base Ethernet header into the register file for the data packet and write one or more values indicating the presence of a base Ethernet header to the appropriate register of the slicer as a step in the formation of the packet class identifier. Once the end of packet header is reached, the slicer writes the completed packet class identifier into the register file.

Generally, the packet class could be caused to be written into the register file by one or more instructions triggered by, for example, a command from the header recognizer indicating the end of the header, a command from the header recognizer indicating a header layer which necessarily ends the data packet header, or a command from the header recognizer indicating a header layer which is not recognised.

If the packet class identifier were to be capable of distinguishing all of the many different permutations of packet header layers, the packet class identifier would need to be a large value. For example, to distinguish all of the permutations of packet header layers supported at a typical Ethernet network interface device, the packet class identifier would have to be able to encode over 130000 different values. It is therefore advantageous if the slicer is configured to generate a packet class identifier which distinguishes only between valid permutations of header layers. For example, a packet composition of Unicast/Ethernet/VLAN/IPv4/TCP is valid, but a packet composition of Unicast/Ethernet/VLAN/IPv4-fragment/TCP is not. A packet class value for the latter composition need not therefore be allocated and the possibility is preferably excluded from the range of values of the packet class identifier. For a typical Ethernet network interface device, the number of valid permutations is around 480, which represents a significant reduction in the number of header permutations that need to be encoded. Packet class compression is preferably performed at the slicer once an identifier of the packet composition has been formed by the slicer. For example, the compression could be performed as the identifier of the packet composition is read out of the registers of the slicer and transferred to the register file. The compression is preferably performed on the output of the registers of the slicer at a hardwired component using combinatorial logic.

It is most advantageous if the packet class identifier in its compressed form is a literal reference to an entry in the instruction memory 116 of the dispatcher which contains the set of instructions which are to be executed in order to effect processing of the header of the subject data packet. This allows the dispatcher to directly access the set of instructions it is to execute for a particular data packet on reading the packet class identifier for that data packet—no memory management unit is required and no processor cycles are lost looking up the correct set of instructions. Because each packet class identifier corresponds to an entry in the instruction memory it is particularly important that the packet class identifier is compressed and represents only valid header combinations: if the packet class identifier were not compressed the instruction memory would have to be very large and wasteful in order to include all of the useless entries corresponding to invalid packet class identifiers for data packet compositions that cannot occur.

The completed packet class identifier (compressed or uncompressed) is preferably also written to an appropriate FIFO message buffer in order to allow other processing entities on the receive/transmit (as appropriate) data path to use the information generated by the slicer. The packet class identifier could be added to the parser_info word described above.

The packet class identifier in the register file identifies to the dispatcher at least some of the instructions it is to execute on the data contained in the register file so as to effect the processing of the header of the subject data packet. The dispatcher uses the packet class identifier as a jump vector to an instruction set stored in its instruction memory 116. In other words, the packet class identifier tells the dispatcher the composition of the subject data packet header and identifies a predetermined set of instructions in its instruction memory to be used to process a data packet header of that composition.

Importantly, the register file of each parsed data packet is constructed by the slicer such that it identifies the sequence of instructions (the execution thread) which are to be executed by the dispatcher and includes any parts of the packet header required for the execution of those instructions. Thus, each register file includes all the data required by the dispatcher to process a data packet of the given packet class. The dispatcher does not require access to the packet header in order to process that header. All of the information needed by the instructions identified to the dispatcher is present in the register file along with the packet class identifier identifying the sequence of instructions which the processor is to execute in order to effect the processing of the subject packet header. Thus the register file tells the dispatcher which instructions to execute and gives the dispatcher all the information it needs to execute those instructions. The register file may contain at least some of the initial state of the execution pipeline 107*a* of the dispatcher. Dispatcher processor 107 accesses the register file over link 110.

The dispatcher 107 performs the header processing using the register file constructed by the slicer. Header processing is generally required to ensure that a received data packet is properly handled (in the case of a HPE implemented at the receive path of a network interface device), or that a data packet for transmission has its header properly completed and the data packet is routed correctly onto the network (in the case of a HPE implemented at the transmit path of a network interface device). Preferably the dispatcher is a RISC processor having a dedicated instruction set. The processing steps performed for a data packet received over a network can include: performing look-ups in a forwarding table, performing network address translation, performing receive side scaling (RSS), and calculating hash values (possibly for use in any of the previously-listed steps). The processing steps performed for a data packet for transmission over a network can include: performing look-ups in a forwarding table, performing network address translation, completing checksums or CRC values, and calculating hash values (possibly for use in any of the previously-listed steps). A dispatcher can therefore include, for example, look-up logic for interfacing to a look-up table (such as a forwarding table) and a hash generator.

In order to synchronise the operation of the components of the header processing engine it is useful for there to be controller logic 114 which ensures that the header recognizer, slicer and dispatcher work in an efficient manner. Other architectures are possible, but the use of central controller logic is preferred because it minimises the complexity of the components of the HPE. The controller ensures that the current data packet is available to the header recognizer and slicer in the appropriate buffer until those two components have finished with the data packet. Also, once the slicer has finished constructing the register file, the controller queues that register file to the dispatcher and (if multiple register files are being used) the controller allocates a new register file to the slicer for the next data packet so that the slicer can begin constructing a register file for the next data packet whilst the dispatcher is processing the current data packet.

The controller logic can additionally be configured to hold a buffer into which at least part of a data packet for processing by the HPE is written. The header recognizer and slicer are configured to read the current data packet for processing from the buffer. Most preferably the buffer is a ping-pong buffer comprising two parts: a first part into which the next data packet for processing is copied, and a second part which holds the current data packet to which the header recognizer and slicer have access. Once the header recognizer and slicer are both finished with the current data packet and the next data packet is loaded into the buffer, the buffer parts are switched. Using buffers supported at the controller logic instead of having the header recognizer and slicer access the receive/transmit (as appropriate) buffers directly reduces the complexity of the logic required.

It is advantageous if there are multiple register files (three are shown in FIG. 1: 104, 105, 106) supported at a memory. This is for two reasons: firstly, this allows slicer 103 and dispatcher 107 to operate on the register files in parallel—i.e. the dispatcher can load one register file and hence process the corresponding packet header whilst the slicer is constructing a different register file; secondly, this allows the dispatcher to perform context switching between the processor threads represented by the state stored in the register files. This second benefit is important for hiding the lookup and hash calculation latencies inherent in header processing.

The ability of the dispatcher to perform context switching essentially allows the dispatcher to perform multi-threaded processing. When the dispatcher processor switches register files the processor actually switches execution threads because each execution thread is defined by the processor state and instructions stored at the register file. The dispatcher is preferably configured to switch register files when the processor calls a function which will cause the processor to wait (i.e. become idle for one or more processor cycles). In this manner, the dispatcher can concurrently process multiple threads (and hence multiple packet headers). If another register file is not ready for execution when the processor calls a function for the current thread which will cause the processor to wait, the processor continues executing the current thread. Functions called by the dispatcher can include calculation units (such as those configured to calculate hash values) and lookup units (such as those configured to lookup entries in forwarding tables)—in other words, those functional units which do not share the execution pipeline of the dispatcher.

When the dispatcher switches register files, the processor writes the current state of its execution pipeline to the appropriate register file so as to preserve the execution thread. The dispatcher processor then reads the state from a different register file (which may be a new register file or may be a register file that has been previously processed in part at the dispatcher) defining a different execution thread and begins execution of that thread using any state for the execution pipeline of the dispatcher which is stored at that different register file. In this manner the dispatcher can continue processing the headers of a different data packet from the point at which processing was previously interrupted. Thus, whenever the dispatcher is not processing an execution thread, the state of that thread is stored in its corresponding register file. Once the calculations which caused the processor to switch context have completed, the results are written to the appropriate register file such that when the processor re-loads that register file it can continue with executing the corresponding thread.

The features described herein allow the dispatcher processor to switch between execution threads so as to in effect provide multi-threaded performance. This is because an instruction sequence and the state of the execution pipeline at which that instruction sequence is executing define the execution thread of those instructions at each moment in time.

The dispatcher can keep track of which functional units are busy performing a calculation or lookup (say) through the use of BUSY flags at the dispatcher. Thus, when the dispatcher calls a functional unit, the busy flag for that unit is set so as to ensure that the results of the operation performed by that unit are not overwritten. It is further advantageous if the functional units each support pipelined operations and have multiple BUSY flags corresponding to multiple different output locations in the registers of the dispatcher processor. This ensures that the functional units are efficiently used.

For example, the dispatcher could have four BUSY flags for a functional unit which correspond to four registers at the dispatcher. When the dispatcher calls the unit to perform a first operation during the execution of a thread, it sets a first one of the BUSY flags corresponding to a first register to which the unit will output the result of the first operation. Meanwhile, the dispatcher might switch to executing another thread and a second call may be required to the same functional unit to perform a second operation. The dispatcher does not overwrite the result of the first operation because the first BUSY flag is set. The dispatcher thus queues the second operation at the unit and sets the second BUSY flag corresponding to a second register to which the unit will write the result of the second operation. Once each operation completes, the execution unit writes the result of the operation to the relevant register. The dispatcher could indicate to the functional unit to which register the unit is to write its output for each lookup operation. Alternatively, the dispatcher could have the functional unit write to its registers in a round-robin fashion.

When the dispatcher again loads the thread for which the call to the functional unit was made and reads the output of the functional unit from the relevant register, the BUSY flag for that register is cleared. The output of the lookup unit could be used at the processor in the execution of subsequent instructions, or the output of the lookup unit could be written to the appropriate register file, as required by the instructions subsequently executed at the dispatcher. In this manner the dispatcher can simultaneously keep track of four different operations at the functional unit, irrespective of the thread being executed.

Preferably the dispatcher supports an instruction that causes it to switch context between the available processor threads represented by the register files. The instruction can be triggered when certain processing events occur, such as those events which take some time to complete (i.e. take multiple processor cycles) and therefore require the dispatcher to wait. For example, the instruction could be triggered when the dispatcher has to perform a look-up in a forwarding table (or similar), or when the dispatcher has to perform a hash calculation. Note that certain calculations (e.g. predetermined types of hash calculation) could be handled at logic external to the dispatcher in response to calls made by the dispatcher.

Once the execution of a thread has completed, any results of the processing which are not already present in the corresponding register file are written to the register file. The completed register file comprises the lookup results, packet fields, hash values and other information required by subsequent processing units on the receive/transmit (as appropriate) path of the network interface device at which the header processing engine is implemented. The completed register file therefore tells the network interface device how to deal with the data packet. For a received data packet this can include: where to write the payload data of the packet, whether or not the packet is valid (i.e. it is properly formed, its checksum is valid), at which processor of an attached data processing system to raise an interrupt (if RSS is in use), etc. For a data packet being prepared for transmission the information can include: the address to which the data packet is to be sent, hash or checksum information to be included in the header of the packet, etc.

The register files (or at least the parts of the register files required for subsequent packet processing) are not necessarily output immediately to a message FIFO (or other data structure) because it is important to maintain the queue of register files in the same order as the queue of data packets in the respective packet buffer. The register files (or their required parts) are therefore output from the HPE in this order such that subsequent processing units on the receive/transmit path can straightforwardly process each data packet using the corresponding register file information generated by the HPE.

The present invention therefore provides an improved architecture for a header processing engine. The functions of the HPE are divided in a novel manner between three components: a header recognizer, a slicer and a dispatcher. The first stage header recognizer identifies what headers are in the subject data packet and the offsets of those headers in the data packet. This allows the header recognizer to provide the slicer with only those instructions it requires to process each header layer and form a register file for the dispatcher. In turn, the register file provides the dispatcher with the instructions it requires to process the header, along with the parts of the header itself required during header processing and a packet class identifier which uniquely identifies the packet's composition. The dispatcher does not therefore need to access the packet header and hence the packet header itself does not need to be held in a buffer while the dispatcher performs its processing.

The structure of the HPE has several advantages:

1. By dividing the functions of the HPE into three components operating in parallel, the efficiency of the HPE is substantially improved. This allows a lower clock frequency to be used for the IC comprising the HPE, which saves power and enables the HPE to be implemented using a less aggressive process technology, thereby reducing the cost of manufacture of the HPE.
2. Because the dispatcher is provided with a register file comprising all the information the dispatcher requires to perform header processing, the instructions (firmware code) executed at the dispatcher can be very deterministic. This reduces the jitter in the operation of the HPE since the time required to process each data packet at the dispatcher is roughly constant for all of the various packet types which are handled by the HPE. Similarly, the time cost of parsing the headers of a data packet at the header recognizer and slicer is roughly constant for all of the various packet types which are handled by the HPE.
3. Additionally, because the dispatcher is provided with a register file comprising all the information the dispatcher requires to perform header processing, the dispatcher need not access the headers of the subject data packet during a sequential parse operation. This leads to reduced latency of operation in comparison with prior art header processing engines. Prior art HPEs perform header processing in a sequential fashion, causing their data-path pipeline to be stalled each time the dispatcher needs to read from the headers of the subject data packet. This requires additional complexity on their data-path pipeline to handle these stalls.
4. By avoiding copying entire headers of a data packet into a register bank of the network interface device, the memory requirement of the HPE is reduced over header processing engines of the prior art. This allows the network interface device to support a smaller amount of memory, which brings power and cost reductions to the design of a network interface device configured in accordance with the present invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A header processing engine comprising:
    a command memory;
    a header recognizer configured to parse headers of a data packet stored at a buffer so as to identify the type and position of each header in the data packet;
    a constructor unit having read access to the headers of the data packet; and
    a processor including an execution pipeline;
    the header recognizer being further configured to, for each header:
    (a) select in dependence on the type of the header one or more commands stored at the command memory; and
    (b) form one or more messages for the constructor unit identifying the selected commands and the position of the header in the data packet;
    wherein the constructor unit is configured to receive the messages and execute the commands identified therein, the commands selected for the headers of the data packet being collectively such as to, when executed by the constructor unit, cause the constructor unit to generate a data structure which is such as to be operable to cause the processor to effect processing of the headers of the data packet without accessing the data packet at the buffer.

2. A header processing engine as claimed in claim 1, the header processing engine further comprising a shared memory accessible to the processor at which the constructor unit is configured to write the data structure.

3. A header processing engine as claimed in claim 1, wherein the data structure identifies a set of instructions for execution by the processor and the processor is configured to access the data structure and execute the instructions identified therein so as to effect processing of the headers of the data packet.

4. A header processing engine as claimed in claim 1, wherein the data structure includes one or more parts of the headers.

5. A header processing engine as claimed in claim 1, wherein the data structure identifies a set of instructions for execution by the processor and the processor is configured to access the data structure and execute the instructions identified therein so as to effect processing of the headers of the data packet,
    and wherein the data structure includes only those parts of the headers required for the execution of one or more of the said instructions.

6. A header processing engine as claimed in claim 3, wherein the data structure includes a packet class identifier which uniquely represents the sequence of headers of the data packet, the packet class identifier identifying the said set of instructions for execution by the processor.

7. A header processing engine as claimed in claim 6, wherein the packet class identifier represents a memory address at an instruction memory of the processor and the processor is configured to, on reading the packet class identifier, access the memory address and initiate execution of the instructions stored at the memory address.

8. A header processing engine as claimed in claim 6, wherein the constructor unit is configured to generate the packet class identifier by forming a representation of the particular sequence of headers of the data packet and passing the representation to a compression engine whose only available outputs correspond to valid sequences of headers, the output of the compression engine being the packet class identifier.

9. A header processing engine as claimed in claim 3, wherein the header processing engine further comprises a shared memory accessible to the processor at which the constructor unit is configured to write the data structure,
    wherein the shared memory is configured to hold a plurality of data structures, each data structure corresponding to a different data packet.

10. A header processing engine as claimed in claim 9, wherein the shared memory is configured to allow the constructor unit and the processor to have concurrent access to different data structures, the processor having exclusive access to data structures completed by the constructor unit.

11. A header processing engine as claimed in claim 9, wherein the processor is configured to, on initiating execution of one or more predetermined instructions that cause the processor to call a functional unit which does not share the execution pipeline of the processor, switch execution threads by:
    storing the state of its execution pipeline at the data structure corresponding to the data packet in respect of which the call is made;
    loading the state of a different data structure stored at the shared memory into its execution pipeline; and
    executing the set of instructions identified at the different data structure.

12. A header processing engine as claimed in claim 11, wherein the processor is configured such that the data returned in response to a call to a functional unit is written to a selected register of the processor so as to be available to the execution pipeline when the processor next loads the state stored at the data structure corresponding to the data packet in respect of which the call was made.

13. A header processing engine as claimed in claim 12, wherein the processor is configured to, on making a call to a functional unit, set a flag for the selected register into which data returned in response to that call is to be written, the flag preventing the processor selecting that register for another call until the flag is cleared.

14. A header processing engine as claimed in claim 13, wherein the processor is configured to, on reading the data from the selected register, clear said flag so as to allow the processor to select that register for a subsequent call.

15. A header processing engine as claimed in claim 11, wherein at least one of the predetermined instructions cause the processor to, when executed, call a lookup engine or a hash engine.

16. A header processing engine as claimed in claim 9, wherein the processor is configured to, responsive to the said instructions, write to each data structure the respective output of the processor.

17. A header processing engine as claimed in claim 3, wherein the header processing engine is located at a network interface device of a data processing system supporting one or more operating systems, and the processor is configured to, responsive to said instructions, provide to the network interface device data identifying a receive queue of the data processing system to which at least part of the received data packet is to be written.

18. A header processing engine as claimed in claim 17, wherein the header processing engine is further configured to, on the processor completing processing of the headers of the data packet, make at least part of the output of the processor available to a packet processing engine of the network interface device, the packet processing engine being configured to process the data packets held at the buffer at least partly in dependence on the output of the processor.

19. A header processing engine as claimed in claim 3, wherein the data packet is a partially-formed data packet and the processor is configured to, responsive to said instructions, process the headers of the partially-formed data packet in such a way as to complete the data packet.

20. A header processing engine as claimed in claim 19, wherein the processor is configured to complete the data packet by performing one or more of the following operations:
   if the data packet belongs to a data flow to be transmitted in accordance with a predetermined level of a quality of service protocol, write appropriate quality of service parameters to the data packet so as to cause the data packet to be handled in accordance with that predetermined level;
   if the data packet is to be transmitted over a virtual LAN, write appropriate virtual LAN parameters to the data packet so as to cause the data packet to be routed over that virtual LAN; and
   if the data packet originated at a virtual interface of a network interface device, perform packet filtering so as to ensure that the data packet is transmitted onto the network only if the destination address of the data packet is a network endpoint to which that virtual interface has been granted access.

21. A header processing engine as claimed in claim 1, wherein each header of the data packet comprises a set of data bits formatted in accordance with a network data protocol and each set of data bits is located within nested headers of the data packet, a footer of the data packet, or at any other point in the data packet.

22. A header processing engine for performing header processing of a sequence of data packets each having multiple headers, the header processing engine comprising:
   a header recognizer configured to parse the multiple headers of each data packet in a sequence of data packets and, for each data packet, form one or more messages indicating the type and position of each header in the data packet, the header recognizer being configured to parse the data packets in sequence; and
   a processor configured to perform header processing on each data packet of the sequence in dependence on the one or more messages formed for that data packet and provide processed data packets in sequence at an output of the processor;
   wherein the header recognizer and the processor are configured to operate in parallel so as to allow the processor to perform header processing on the data packets out of sequence.

23. A header processing engine as claimed in claim 22, wherein the header recognizer and processor operate such that when the processor is processing one data packet in a sequence of data packets, the header recognizer is parsing another data packet in the sequence.

24. A header processing engine as claimed in claim 22, wherein the header recognizer is configured to parse the headers of the data packet sequentially and to, on identifying the type and position of each header in the data packet, form a message for the processor comprising the type of that header and the position of that header in the data packet.

25. A header processing engine as claimed in claim 22, wherein the header recognizer is configured to identify the position of each header in the data packet by detecting one or more predetermined sequences of bits in the headers of the data packet.

26. A header processing engine as claimed in claim 25, wherein the predetermined sequences of bits indicate the start or end of a header.

27. A header processing engine as claimed in claim 22, wherein the header recognizer is operable to identify the type of a header in the data packet by detecting one or more predetermined values representing header type.

28. A header processing engine as claimed in claim 22, wherein the header recognizer is operable to identify the type of a header in the data packet using the position of the header in the data packet.

29. A header processing engine as claimed in claim 22, wherein the processor is configured to, in dependence on the types of header identified in the one or more messages formed for a particular data packet, select a set of instructions stored at an instruction memory of the processor and process that data packet using the selected set of instructions.

30. A header processing engine as claimed in claim 22, wherein the header recognizer is configured to, in dependence on the types of header identified in the one or more messages formed for a particular data packet, select a set of instructions stored at an instruction memory of the processor and cause the processor to process that data packet using the selected set of instructions.

31. A header processing engine for performing header processing of a sequence of data packets stored at a buffer, each of the data packets in the sequence having multiple headers and the header processing engine comprising:
   a processor having an execution pipeline; and
   a pre-processor unit configured to parse headers of a data packet stored at the buffer and, in dependence on the types of headers in the data packet, form a data structure identifying a set of instructions, the data structure being such as to be operable to cause the processor to effect processing of the headers of the data packet without accessing the data packet stored at the buffer; wherein the processor is configured to access the data structure and execute the said set of instructions so as to process the headers of the data packet.

32. A header processing engine as claimed in claim 31, the header processing engine further comprising a shared memory accessible to the processor at which the pre-processor unit is configured to write the data structure.

33. A header processing engine as claimed in claim 31, wherein the data structure includes one or more parts of the headers of the data packet.

34. A header processing engine as claimed in claim 33, wherein the data structure includes only those parts of the headers required by one or more of the said instructions.

35. A header processing engine as claimed in claim 31, wherein the pre-processor unit is configured to select the set of instructions in dependence on the types of headers in the data packet.

36. A header processing engine as claimed in claim 31, wherein the processor supports an instruction memory and the set of instructions are stored in the instruction memory at a location identified in the data structure.

37. A header processing engine as claimed in claim 31, wherein the pre-processor unit is configured to generate a packet class identifier which uniquely represents the types of headers of the data packet, the packet class identifier being included in the data structure and identifying the said set of instructions for execution by the processor.

38. A header processing engine as claimed in claim 37, wherein the packet class identifier represents a memory address at an instruction memory of the processor and the processor is configured to, on reading the packet class identifier, access the memory address and initiate execution of the instructions stored at the memory address.

39. A header processing engine as claimed in claim 37, wherein the pre-processor unit is configured to generate the packet class identifier by forming a representation of the particular sequence of headers of the data packet and passing the representation to a compression engine whose only available outputs correspond to valid sequences of headers, the output of the compression engine being the packet class identifier.

40. A header processing engine as claimed in claim 33, wherein the header processing engine further comprises a shared memory accessible to the processor at which the pre-processor unit is configured to write the data structure, wherein the shared memory is configured to hold a plurality of data structures, each data structure corresponding to the headers of a different data packet.

41. A header processing engine as claimed in claim 40, wherein the shared memory is configured to allow the pre-processor unit and the processor to have concurrent access to different data structures, the processor having exclusive access to data structures completed by the pre-processor unit.

42. A header processing engine as claimed in claim 40, wherein the processor is configured to, on initiating one or more predetermined instructions that cause the processor to call a functional unit which does not share the execution pipeline of the processor, store the state of its execution pipeline at the data structure corresponding to the data packet in respect of which the call is made and load the state of a different data structure stored at the shared memory into its execution pipeline.

43. A header processing engine as claimed in claim 42, wherein the processor is configured such as to cause the data returned in response to a call to a functional unit to be written to a selected register of the processor so as to be available to the execution pipeline when the processor next loads the state stored at the data structure corresponding to the data packet in respect of which the call was made.

44. A header processing engine as claimed in claim 43, wherein the processor is configured to, on making a call to a functional unit, set a flag for the selected register into which data returned in response to that call is to be written, the flag preventing the processor selecting that register for another call.

45. A header processing engine as claimed in claim 44, wherein the processor is configured to, on reading the data from the selected register, clear said flag so as to allow the processor to select that register for a subsequent call.

46. A header processing engine as claimed in claim 42, wherein at least one of the predetermined instructions cause the processor to, when executed, call a lookup engine, a hash engine, a checksum or CRC calculation engine, an encryption engine, or a chain of any of the aforementioned engines arranged in any order.

47. A header processing engine as claimed in claim 40, wherein the processor is configured to, responsive to the said instructions, write to each data structure the respective output of processing performed by the processor.

48. A processor configured for processing network data packets, the processor comprising:
an instruction memory storing a plurality of instruction sequences;
a processor memory for storing a plurality of instruction references and sets of state of the processor, each instruction reference identifying an instruction sequence stored at the instruction memory and each set of state corresponding to an instruction reference; and
an execution pipeline operable to execute an instruction sequence identified by an instruction reference using the corresponding set of state stored at the processor memory, an instruction sequence and its corresponding state defining an execution thread for processing a particular network data packet;
the processor being configured to, during processing of a first network data packet by executing an instruction sequence identified by a first instruction reference, switch execution threads so as to process a second network data packet by:
writing the state of the execution pipeline to a first set of state at the processor memory;
loading a second set of state into the execution pipeline from the processor memory; and
executing a second instruction sequence identified by an instruction reference corresponding to the second set of state;
wherein the processor is configured to switch execution threads on initiating execution of one or more predetermined instructions in an instruction sequence.

49. A processor as claimed in claim 48, wherein the first set of state includes an indication of the position in the first instruction sequence up to which execution has been performed.

50. A processor as claimed in claim 48, wherein the predetermined instruction causes the processor to, when executed, call a functional unit which does not share the execution pipeline of the processor.

51. A processor as claimed in claim 50, wherein the functional unit is supported at the processor.

52. A processor as claimed in claim 50, the processor further comprising a plurality of registers and being configured such as to cause the data returned in response to a call to the functional unit to be written to a selected one of the registers.

53. A processor as claimed in claim 48, the processor being configured to switch between the plurality of execution threads defined at the processor memory on a round-robin basis and, on subsequently switching back to the execution thread defined by the first set of state and the first instruction sequence:
write the state of the execution pipeline to the processor memory at the set of state corresponding to the instruction sequence being executed at the execution pipeline;
load the first set of state into the execution pipeline; and
continue execution of the first instruction sequence.

54. A method for switching between execution threads at a processor configured for processing network data packets, the method comprising:
processing a first network data packet by executing by an execution pipeline of the processor a first instruction sequence identified by a first instruction reference stored in a memory of the processor;

pausing the execution pipeline;
writing a state of the execution pipeline to a first set of state in the processor memory;
loading a second set of state into the execution pipeline from the processor memory; and
executing in the execution pipeline a second instruction sequence identified by a second instruction reference stored in the processor memory, so as to effect processing of a second network data packet,
wherein the first instruction sequence and second instruction sequence correspond to execution threads for processing respectively the first and second network packets.

* * * * *